J. N. SISLEY.
FILTER.
APPLICATION FILED SEPT. 16, 1911.
1,021,076.
Patented Mar. 26, 1912.
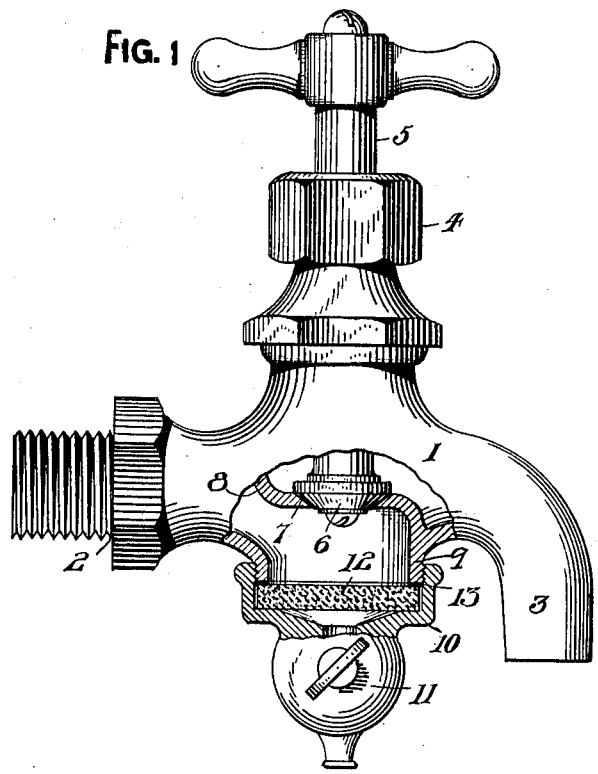
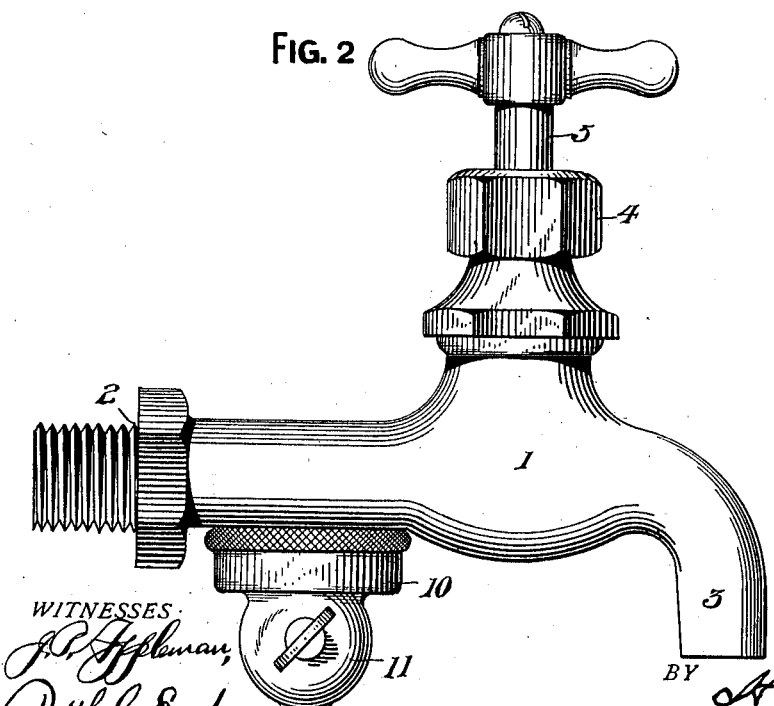
WITNESSES
INVENTOR.
John N. Sisley
BY
ATTORNEY.

UNITED STATES PATENT OFFICE.

JOHN NELSON SISLEY, OF CONNELLSVILLE, PENNSYLVANIA.

FILTER.

1,021,076.

Specification of Letters Patent.

Patented Mar. 26, 1912.

Application filed September 16, 1911. Serial No. 649,682.

*To all whom it may concern:*

Be it known that I, JOHN NELSON SISLEY, a citizen of the United States of America, residing at Connellsville, in the county of Fayette and State of Pennsylvania, have invented certain new and useful Improvements in Filters, of which the following is a specification, reference being had therein to the accompanying drawing.

This invention relates to filters particularly designed for spigots, faucets and various types of valves.

The primary object of the invention is to furnish a spigot or faucet with a simple and inexpensive filter for removing various kinds of germs and foreign matter from water that is especially utilized for drinking purposes.

Another object of this invention is to furnish a spigot or faucet with a detachable filter that can be removed and renewed, or flushed without detaching the same.

A further object of this invention is to provide a filter for spigots or faucets consisting of comparatively few parts easily and quickly assembled and highly efficient for the purposes for which they are intended.

I attain the above objects by a mechanical construction that will be hereinafter specifically described and then claimed, and reference will now be had to the drawing, wherein:—

Figure 1 is a side elevation of a spigot or faucet partly broken away and partly in section, showing a preferred arrangement of the filter, and Fig. 2 is a side elevation of a spigot or faucet showing a different arrangement of the filter from that illustrated in Fig. 1.

The reference numeral 1 denotes the body or globe of a faucet or spigot having a male connection 2, a spout 3, a stuffing box 4 and a T handle 5. The T handle 5 is adapted to raise and lower a valve 6 from a valve seat 7 provided therefor in a horizontal partition 8 of the body or globe 1.

The body or globe 1 has a depending exteriorly threaded nipple 9 and screwed upon this nipple is the cup-shaped head 10 of a pet cock 11 or other suitable outlet valve. Arranged within the cup-shaped head 10 is a disk or body 12 of filtering material, as sandstone, pumice or other porous material adapted to filter and screen water to that extent as to remove foreign matter, as germs, bacteria, sediment, etc. Interposed between the disk of filtering material and the lower end of the nipple 9 is a washer or gasket 13 which is adapted to firmly hold the filtering material in place and prevent the disk of filtering material from being broken or otherwise injured when the cup-shaped head 10 is screwed upon the nipple 9. The gasket or washer 13 also assists in maintaining a non-leakable connection between the cup-shaped head 10 and the nipple 9.

When the valve 6 is closed, the pressure of water is upon the filtering material 12 and the water will gradually seep through the material, the seepage depending upon the density of the filtering material. With the pet cock 11 open, filtered water can be obtained from the spigot or faucet and with the pet cock closed and the valve 6 open, the upper surface of the filtering material can be flushed or ordinary water obtained.

In Fig. 2 of the drawing there is illustrated a slight modification of the invention, wherein the cup-shaped head 10 of the pet cock 11 is connected to the male connection 2 of the spigot or faucet, said connection having a depending nipple for the head 10.

From the foregoing it will be observed that the spigot or faucet can be advantageously used in a kitchen, where it is often desired to obtain drinking water and then again to use a large quantity of water for dishwashing purposes. As a great many spigots or faucets are constructed with the nipple 9, which is closed under ordinary circumstances by a cap or plug, the cap or plug can be removed, and the pet cock containing the filtering material installed, thereby obviating the necessity of especially constructing a spigot or faucet to accommodate the pet cock.

The invention is not limited to the character of the filtering material employed or to its exact arrangement, and such other changes as fall within the scope of the appended claims can be resorted to without departing from the spirit of the invention.

What I claim is:—

1. In a filter, a faucet having a depending nipple below the valve plug thereof and in permanent communication with the inlet of the faucet and closed to the outlet by the valve of the latter, a pet cock having an annular head secured to said nipple, and a disk of filtering material seated in the head and abutting against the lower edge of the nipple.

2. In a filter, a faucet having a depending nipple in permanent communication with the inlet of the faucet and closed to the outlet of the faucet by the valve of the latter, a pet cock having an enlarged head engaging with the periphery of the nipple, and a disk of filtering material seated in the head and abutting against said nipple.

3. In a filter, a faucet including a nozzle and a valve seat and further including an annular nipple depending below the valve seat, said nipple in permanent communication with the inlet of the faucet and closed to the outlet of the faucet by the valve of the latter, a pet cock having an enlarged head engaging with the periphery of said nipple, said head having a flattened portion to provide a seat, and a disk of filtering material mounted upon said seat and abutting against said nipple.

4. In a filter, a faucet provided in proximity to its nozzle with a depending nipple in permanent communication with the inlet of the faucet and closed to the outlet of the faucet by the valve of the latter, a pet cock having an enlarged head secured to said nipple, and a disk of filtering material interposed between the head and the nipple.

In testimony whereof I affix my signature in the presence of two witnesses.

JOHN NELSON SISLEY.

Witnesses:
ALEX M. BETH,
GEO. BALSLEY.

---

Copies of this patent may be obtained for five cents each, by addressing the "Commissioner of Patents Washington, D. C."